US012610349B2

(12) United States Patent
Zhao et al.

(10) Patent No.: US 12,610,349 B2
(45) Date of Patent: Apr. 21, 2026

(54) RESOURCE SELECTION METHOD AND APPARATUS, AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 634 days.

(21) Appl. No.: 17/882,086

(22) Filed: Aug. 5, 2022

(65) Prior Publication Data

US 2022/0377709 A1 Nov. 24, 2022

Related U.S. Application Data

(63) Continuation of application No. PCT/CN2020/074538, filed on Feb. 7, 2020.

(51) Int. Cl.
*H04W 72/02* (2009.01)
*H04W 72/04* (2023.01)
(Continued)

(52) U.S. Cl.
CPC ....... *H04W 72/02* (2013.01); *H04W 72/0446* (2013.01); *H04W 76/28* (2018.02); *H04W 92/18* (2013.01)

(58) Field of Classification Search
CPC . H04W 72/02; H04W 72/0446; H04W 76/28; H04W 92/18; H04W 76/14;
(Continued)

(56) References Cited

U.S. PATENT DOCUMENTS

| | | | | |
|---|---|---|---|---|
| 2013/0258924 | A1 | 10/2013 | Imamura et al. | |
| 2018/0077748 | A1* | 3/2018 | Kazmi | H04W 76/14 |

(Continued)

FOREIGN PATENT DOCUMENTS

| | | | |
|---|---|---|---|
| CN | 107241786 | A | 10/2017 |
| CN | 109964519 | A | 7/2019 |

(Continued)

OTHER PUBLICATIONS

3GPP, "UE procedure for determining the subset of resources to be reported to higher layers in PSSCH resource selection in sidelink transmission mode 4 and in sensing measurement in sidelink transmission mode 3". 3GPP TS 36.213 V15.8.0 (Dec. 2019)—Release 15, Section 14.1.1.6, 4 pages.

(Continued)

*Primary Examiner* — Schquita D Goodwin

(74) *Attorney, Agent, or Firm* — Sheppard, Mullin, Richter & Hampton LLP

(57) ABSTRACT

Embodiments of the present disclosure provide a resource selection method and apparatus, and a terminal device. The method includes: obtaining, by a first terminal device, first Discontinuous Reception (DRX) configuration information used for determining a first time range for a second terminal device; and selecting, by the first terminal device, a first resource having a time domain position located within the first time range.

17 Claims, 6 Drawing Sheets

(a)

(b)

(51) Int. Cl.

| | | |
|---|---|---|
| *H04W 72/0446* | (2023.01) | |
| *H04W 76/28* | (2018.01) | |
| *H04W 92/18* | (2009.01) | |

(58) Field of Classification Search
CPC ... H04W 52/0216; H04W 4/46; H04W 72/25; H04W 72/51; H04W 72/542; Y02D 30/70
See application file for complete search history.

(56) References Cited

U.S. PATENT DOCUMENTS

| | | | |
|---|---|---|---|
| 2019/0090198 A1* | 3/2019 | Zhao | H04W 76/14 |
| 2021/0051587 A1* | 2/2021 | Wu | H04W 68/02 |
| 2021/0051588 A1* | 2/2021 | Wu | H04W 56/001 |
| 2021/0058866 A1* | 2/2021 | Hosseini | H04W 72/23 |
| 2022/0030580 A1* | 1/2022 | Lee | H04W 72/20 |
| 2022/0201607 A1* | 6/2022 | Zhao | H04W 52/0219 |
| 2022/0322486 A1* | 10/2022 | Park | H04W 4/08 |
| 2022/0330210 A1* | 10/2022 | Zhang | H04W 72/02 |
| 2022/0346011 A1* | 10/2022 | Hong | H04W 52/02 |
| 2022/0417854 A1* | 12/2022 | Park | H04W 52/0235 |
| 2023/0066448 A1* | 3/2023 | Tseng | H04W 76/28 |

FOREIGN PATENT DOCUMENTS

| | | |
|---|---|---|
| CN | 107241678 B | 8/2019 |
| CN | 110463338 A | 11/2019 |
| CN | 110637483 A | 12/2019 |
| CN | 109392183 B | 9/2022 |
| WO | 2009022748 A1 | 2/2009 |
| WO | 2015176251 A1 | 11/2015 |
| WO | 2018028416 A1 | 2/2018 |
| WO | 2018064477 A1 | 4/2018 |
| WO | 2018218683 A1 | 12/2018 |
| WO | 2019031926 A1 | 2/2019 |
| WO | 2019084927 A1 | 5/2019 |
| WO | 2019091098 A1 | 5/2019 |
| WO | 2019160788 A1 | 8/2019 |

OTHER PUBLICATIONS

Extended European Search Report dated Dec. 21, 2022 received in European Patent Application No. EP20917836.7.

International Search Report and Written Opinion dated Nov. 4, 2020 in International Application No. PCT/CN2020/074538. English translation attached.

LG Electronics Inc. "Consideration for DRX in NR", 3GPP TSG-RAN2 Meeting NR AH#2 R2-1706750, Jun. 16, 2017 (Jun. 16, 2017), the entire document.

Sony. "Discussion on sidelink resource allocation and configuration", 3GPP TSG RAN WG1 Meeting #90 R1-1712982, Aug. 11, 2017 (Aug. 11, 2017), the entire document.

First Office Action from corresponding Chinese Application No. 202210901363.7, dated Jul. 7, 2023. English translation attached.

Huawei et al."Discussion on Uu-based sidelink resource allocation/configuration," 3GPP tsg_ran\wg1_rl1,tsgr1_95, R1-1812213, (Nov. 2018) Nov. 2018, full text, 9 pages.

Li et al., "Study on radio resource pool sharing technology in LTE-eV2X", Telecommunications Engineering Technology and Standardization, Issue 10, Oct. 15, 2018, full text. English translation of Abstract only.

The Grant Notice from corresponding Chinese Application No. 202210901363.7, dated Sep. 7, 2023. English translation attached.

Communication pursuant to Article 94(3) EPC for European application 20917836.7 mailed Sep. 15, 2023.

Gorantla et al. "Resource and Computationally Efficient Subchannel Allocation for D2D in Multi-Cell Scenarios With Partial and Asymmetric CSI" IEEE Transactions on Wireless Communications, Nov. 11, 2019, full text, p. 1-11.

* cited by examiner

UE1          Data          UE2

Communication group

UE2

UE1          UE3

UE4

UE2

UE7

UE1          UE3          UE6

UE4

UE5 n-1000  Sensing window          n          n+100          t
                          Selection window

RESOURCE SELECTION METHOD AND APPARATUS, AND TERMINAL DEVICE

CROSS-REFERENCE TO RELATED APPLICATIONS

The present application is a continuation of International Application No. PCT/CN2020/074538 filed on Feb. 7, 2020, which is hereby incorporated by reference in its entirety.

TECHNICAL FIELD

Embodiments of the present disclosure relate to the field of mobile communication technologies, and more particularly, to a resource selection method and apparatus, and a terminal device.

BACKGROUND

In the topic of sidelink enhancement, introduction of a Discontinuous Reception (DRX) mechanism in sidelink transmission has been discussed. In this case, a terminal device is not always in a state of receiving data, but receives data in an on duration based on a DRX configuration. In the on duration, the terminal device is in a continuous reception (or continuous sensing) state. When the terminal device receives no data, it may transition to DRX. That is, the continuous sensing state is terminated (off duration), thereby achieving a purpose of power saving. However, for unicast communication and multicast communication, data transmitted by a transmitting terminal needs to be received by a receiving terminal. Therefore, after the introduction of the DRX mechanism, it is a problem to be solved regarding how to ensure reliability of sidelink transmission.

SUMMARY

Embodiments of the present disclosure provide a resource selection method and apparatus, and a terminal device.

According to an embodiment of the present disclosure, a resource selection method is provided. The method includes: obtaining, by a first terminal device, first DRX configuration information used for determining a first time range for a second terminal device; and selecting, by the first terminal device, a first resource having a time domain position located within the first time range.

According to an embodiment of the present disclosure, a resource selection apparatus is provided. The apparatus includes: an obtaining unit configured to obtain first DRX configuration information used for determining a first time range for a second terminal device; and a selecting unit configured to select a first resource having a time domain position located within the first time range.

According to an embodiment of the present disclosure, a terminal device is provided. The terminal device includes: a memory having a computer program stored thereon; and a processor configured to invoke and execute the computer program stored in the memory to perform the resource selection method as described above.

According to an embodiment of the present disclosure, a chip is provided. The chip is configured to perform the resource selection method as described above.

Specifically, the chip includes a processor configured to invoke and execute a computer program from a memory to cause an apparatus provided with the chip to perform the resource selection method as described above.

According to an embodiment of the present disclosure, a computer-readable storage medium is provided. The computer-readable storage medium stores a computer program. The computer program causes a computer to perform the resource selection method as described above.

According to an embodiment of the present disclosure, a computer program product is provided. The computer program product includes computer program instructions. The computer program instructions cause a computer to perform the resource selection method as described above.

According to an embodiment of the present disclosure, a computer program is provided. The computer program, when executed on a computer, causes the computer to perform the resource selection method as described above.

With the above technical solutions, the first terminal device selects a transmission resource based on the first time range for the second terminal device, such that sidelink data transmitted by the first terminal device via the transmission resource can be received by the second terminal device, thereby ensuring reliability of sidelink transmission.

BRIEF DESCRIPTION OF DRAWINGS

The accompanying drawings described here are used to provide a further understanding of the present disclosure and constitute a part of the present disclosure. Exemplary embodiments of the present disclosure and description thereof are used to explain the present disclosure, and do not constitute an improper limitation of the present disclosure. In the accompanying drawings:

FIG. 2-1 is a schematic diagram showing a mode A according to an embodiment of the present disclosure.

FIG. 2-2 is a schematic diagram showing a mode B according to an embodiment of the present disclosure.

FIG. 3-1 is a schematic diagram showing unicast according to an embodiment of the present disclosure.

FIG. 3-2 is a schematic diagram showing multicast according to an embodiment of the present disclosure.

FIG. 3-3 is a schematic diagram showing broadcast according to an embodiment of the present disclosure.

FIG. 4 is a schematic diagram showing a resource selection according to an embodiment of the present disclosure.

FIG. 7-1 is a first schematic diagram showing a DRX pattern according to an embodiment of the present disclosure.

FIG. 7-2 is a second schematic diagram showing a DRX pattern according to an embodiment of the present disclosure.

FIG. 7-3 is a third schematic diagram showing a DRX pattern according to an embodiment of the present disclosure.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Long Term Evolution (LTE) system, an LTE Frequency Division Duplex (FDD) system, an LTE Time Division Duplex (TDD) system, a 5th-Generation (5G) communication system, or a future communication system, etc.

Figure 1:
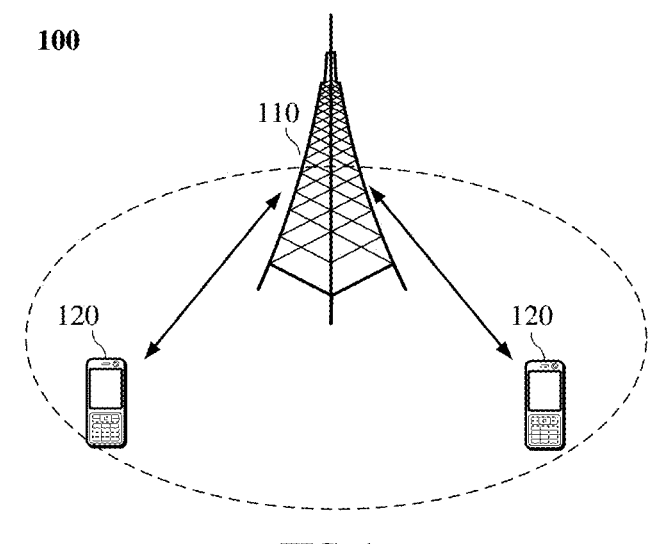
FIG. 1 is a schematic diagram showing a communication system architecture according to an embodiment of the present disclosure.

Exemplarily, a communication system 100 applied in an embodiment of the present disclosure is as illustrated in FIG. 1. The communication system 100 may include a network device 110. The network device 110 may be a device that communicates with a terminal device 120 (or called a communication terminal or a terminal). The network device 110 may provide communication coverage for a specific geographic region, and may communicate with a terminal device located in the coverage region. Optionally, the network device 110 may be Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal device 120 located within the coverage region of the network device 110. The "terminal device" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or via another data connection/network, and/or via a wireless interface, for example, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter, and/or via another terminal device; and/or an Internet of Things (IoT) device. A terminal device configured to communicate through the wireless interface may be referred to as a "wireless communication terminal", a "wireless terminal", or a "mobile terminal". Examples of the mobile terminal include but are not limited to, a satellite or a cellular phone, a Personal Communication System (PCS) terminal that may combine a cellular radiotelephone with capabilities such as data processing, facsimile and data communication, a Personal Digital Assistant (PDA) that may include a radiotelephone, a pager, an Internet/intranet access, a Web browser, a notepad, a calendar, and/or a Global Positioning System (GPS) receiver, and a conventional laptop and/or palmtop receiver, or other electronic devices including a radiotelephone transceiver. The terminal device can refer to an access terminal, a User Equipment (UE), a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in the future evolved PLMN, etc.

Optionally, direct communication, such as Device to Device (D2D) communication, may be performed between the terminal devices 120.

Optionally, the 5G communication system or the 5G network may also be referred to as an NR system or an NR network.

FIG. 1 exemplarily illustrates one network device and two terminal devices. Optionally, the communication system 100 may include a plurality of network devices, and coverage of each network device may include a different number of terminal devices. The embodiments of the present disclosure are not limited to any of these examples.

Optionally, the communication system 100 may also include other network entities such as a network controller and a mobility management entity, and the embodiments of the present disclosure are not limited to any of these examples.

It should be understood that, in the embodiment of the present disclosure, a device having a communication function in a network/system may be referred to as a communication device. Taking the communication system 100 illustrated in FIG. 1 as an example, communication devices may include the network device 110 and the terminal devices 120, each having a communication function. The network device 110 and the terminal device 120 may be any of specific devices described above, and details thereof will be omitted here. The communication device may also include another device in the communication system 100, for example other network entities such as a network controller, a mobility management entity, etc., and the embodiments of the present disclosure are not limited to any of these examples.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

To facilitate understanding of the technical solutions of the embodiments of the present disclosure, the technical solutions related to the embodiments of the present disclosure will be described below.

Device to Device (D2D)

D2D communication is based on SideLink (SL) transmission technology. Unlike the conventional cellular system where communication data is received or transmitted through a base station, an Internet of Vehicles system uses D2D communication (i.e., direct D2D communication) and therefore has higher spectral efficiency and lower transmission latency. For D2D communication, the $3^{rd}$ Generation Partnership Project (3GPP) has defined two transmission modes: Mode A and Mode B, which are described below.

Figures 1, 2:
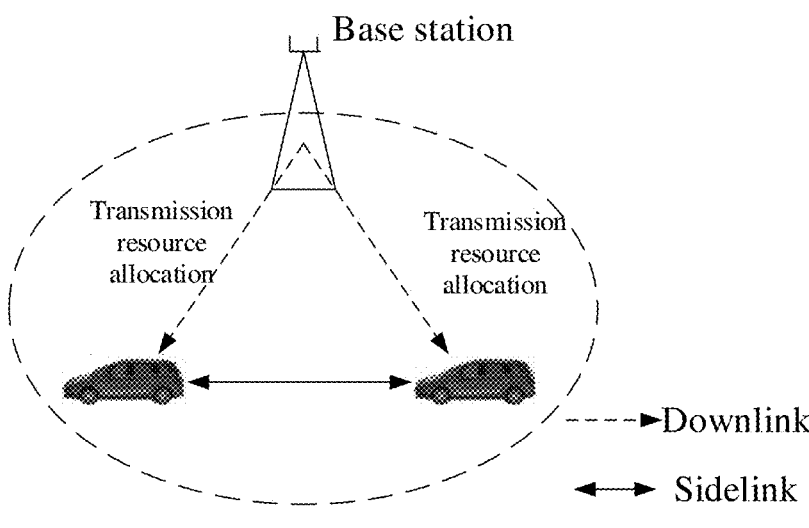
Figure 2:
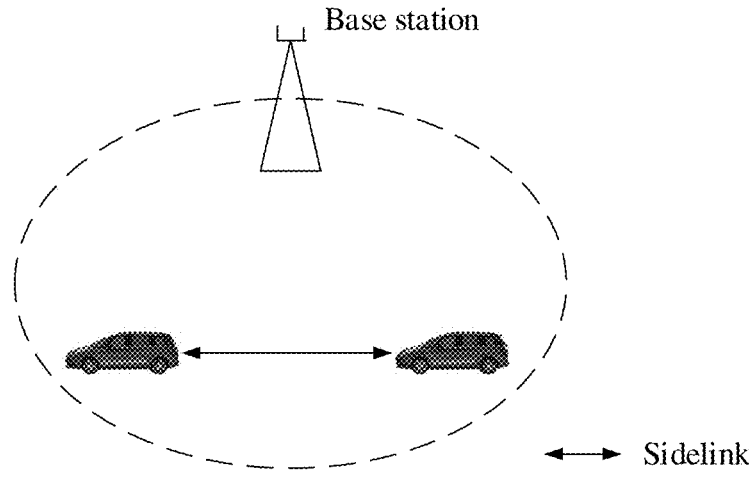

Mode A: as illustrated in FIG. 2-1, a transmission resource for a terminal device is allocated by a base station. The terminal device transmits data on a sidelink based on the resource allocated by the base station. The base station may allocate a resource for single transmission or semi-persistent transmission to the terminal device.

Mode B: as illustrated in FIG. 2-2, the terminal device selects a resource from a resource pool for data transmission. Specifically, the terminal device may select a transmission resource from the resource pool by sensing or random selection.

New Radio (NR)—Vehicle to Everything (V2X)

In NR-V2X, there is a need to support autonomous driving, and therefore higher requirements are imposed on data interaction between vehicles, such as higher through-put, lower latency, higher reliability, larger coverage, and more flexible resource allocation.

In an NR-V2X system, different transmission modes are introduced, including Mode 1 and Mode 2. Here, in Mode 1, the network device allocates a transmission resource to the terminal device (corresponding to Mode A described above), and in Mode 2, the terminal device selects a transmission resource (corresponding to Mode B described above).

Figures 1, 2, 3, 4:
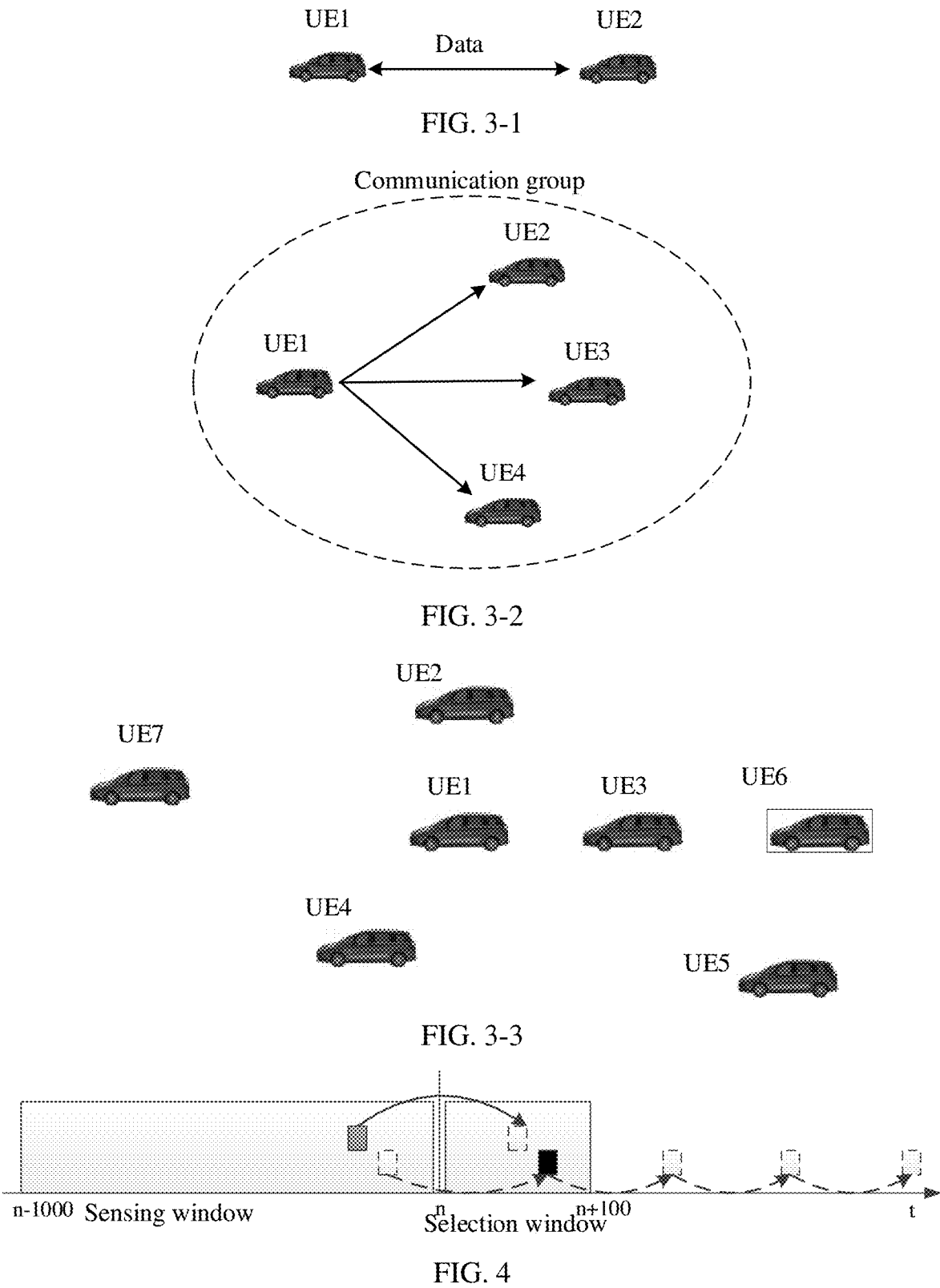

LTE-V2X supports a broadcast transmission mode. In addition, unicast and multicast transmission modes are introduced in NR-V2X. In the unicast transmission mode, there is only one terminal device as the receiving terminal. As illustrated in FIG. 3-1, unicast transmission is performed between UE1 and UE2. In the multicast transmission mode, the receiving terminals include all terminal devices within a communication group or a certain transmission distance. As illustrated in FIG. 3-2, UE1, UE2, UE3, and UE4 form a communication group, in which UE1 transmits data and all other terminal devices within the communication group are receiving terminals. For the broadcast transmission mode, the receiving terminals include any terminal devices. As illustrated in FIG. 3-3, UE1 is a transmitting terminal and all other terminal devices around UE1 are receiving terminals.

Sensing-Based Resource Selection Method

In LTE-V2X, full or partial sensing is supported. Here, in full sensing, the terminal device may sense data transmitted by other terminal devices in all slots (or subframes) other than a slot where data is transmitted; and in partial sensing, for a purpose of power saving of the terminal device, the terminal device only needs to sense a part of slots (or subframes), and perform resource selection based on a result of partial sensing. Further, when partial sensing is not configured by a higher layer, the terminal device adopts full sensing for resource selection by default.

The following describes main steps of a sensing-based resource selection in LTE-V2X, and for a detailed process, reference may be made to 3GPP TS36.213 V14.3.0.

When a new packet arrives at a time point n and thus resource selection is required, the terminal device may perform the resource selection within [n+T1, n+T2] milliseconds (i.e., time corresponding to a selection window) based on a sensing result in the past 1 second (i.e., time corresponding to a sensing window), where $T1 \leq 4$, $T_{2min}$ $(prio_{TX}) \leq T_2 \leq 100$, the value selected for T1 should be higher than a processing latency of the terminal device, and the value selected for T2 should fulfill a latency requirement of a service. For example, if the latency requirement of the service is 50 ms, $20 \leq T2 \leq 50$; or if the latency requirement of the service is 100 ms, then $20 \leq T2 \leq 100$, as illustrated in FIG. 4.

A process of a resource selection performed by the terminal device within the selection window is described as follows (it should be noted that a number of major resource selection steps are listed below).

The terminal device treats all available resources within the selection window as Set A and performs the following exclusion operations on resources in Set A.

1. When the terminal device has no sensing result for some subframes within the sensing window, resources on subframes within the selection window corresponding to these subframes are excluded.

2. When the terminal device detects a Physical Sidelink Control Channel (PSCCH) within the sensing window, Reference Signal Received Power (RSRP) of the PSSCH, referred to as PSSCH-PSSCH, is measured. When the measured PSSCH-RSRP is higher than a PSSCH-RSRP threshold, and it is determined from reservation information carried by the PSCCH that a resource conflict exits between a transmission resource reserved by the PSCCH and data to be transmitted by a user, the resource is excluded from Set A. Here, the PSSCH-RSRP threshold is selected based on priority information carried in the detected PSCCH and a priority of data to be transmitted by the terminal device.

3. When a number of remaining resources in Set A is smaller than 20% of a total number of resources, the terminal device may raise the PSSCH-RSRP threshold by 3 dB and repeat step 1 and step 2 until the number of remaining resources in Set A is greater than 20% of the total number of resources.

4. The terminal device performs a Sidelink Received Signal Strength Indicator (S-RSSI) detection on the remaining resources in Set A, sorts the remaining resources based on energy levels, and puts resources having the bottom 20% (relative to a number of resources in Set A) energy levels into Set B.

5. The terminal device selects a resource from Set B with equal probability for data transmission.

DRX Mechanism for NR Uu Interface

In a wireless network, when the terminal device keeps sensing a Physical Downlink Control Channel (PDCCH), and performs data transmission and reception based on indication messages that are transmitted from a network side, the terminal device may therefore consume a large amount of power. Therefore, the 3GPP standard protocol introduces a DRX power saving strategy in an LTE system.

Figure 5:
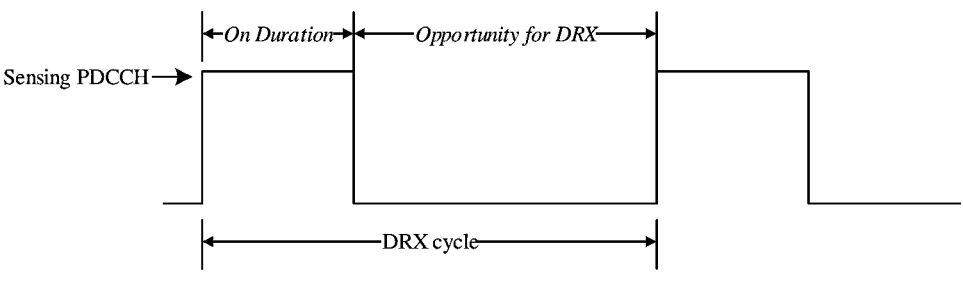
FIG. 5 is a schematic diagram showing a DRX cycle according to an embodiment of the present disclosure.

A basic mechanism of DRX is to configure a DRX cycle for the terminal device in a Radio Resource Control Connected (RRC_CONNECTED) state. As illustrated in FIG. 5, the DRX cycle consists of "On Duration" and "Opportunity for DRX". Here, during the "On Duration" (also called a continuous sensing range), the terminal device senses and receives the PDCCH (i.e., the terminal device is active). When the terminal receives no PDCCH within the continuous sensing range, the terminal may stop continuous sensing and transition to a DRX state within the "Opportunity for DRX" period, where the terminal device does not receive PDCCH to reduce the power consumption (i.e., the terminal device is dormant). In the DRX operation, the terminal device controls the on duration and off duration of the terminal device based on some timer parameters configured by the network.

In sidelink-based transmission, the DRX mechanism is not introduced. Considering that an Internet of Vehicles service may be transmitted in a broadcast manner, all terminal devices are in a receiving state when they are not transmitting data, such that the terminal devices may consume a large amount of power. Therefore, it is a problem that needs to be solved regarding how to reduce power consumption, especially for handheld terminals.

In the topic of sidelink enhancement, introduction of a DRX mechanism in sidelink transmission has been discussed. In this case, the terminal device is not always in a state of receiving data, but receives data in an on duration based on a DRX configuration. When the terminal device receives no data, the terminal device may transition to DRX (off duration), thereby achieving a purpose of power saving. However, for unicast communication and multicast communication, data transmitted by the transmitting terminal needs to be received by a receiving terminal. Therefore, after the introduction of the DRX mechanism, it is a problem to be solved regarding how to ensure reliability of the sidelink transmission. To this end, the following technical solutions according to the embodiments of the present disclosure are proposed.

Figure 6:
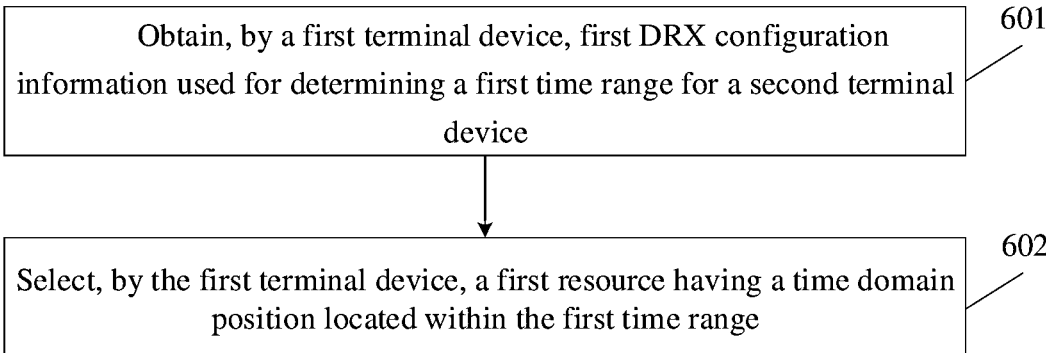
FIG. 6 is a schematic flowchart illustrating a resource selection method according to an embodiment of the present disclosure.

FIG. 6 is a schematic flowchart illustrating a resource selection method according to an embodiment of the present disclosure. As illustrated in FIG. 6, the resource selection method includes the following steps.

At block 601, a first terminal device obtains first DRX configuration information used for determining a first time range for a second terminal device.

In an embodiment of the present disclosure, the first terminal device is a transmitting terminal of sidelink data, and the second terminal device is a receiving terminal of the sidelink data.

In an embodiment of the present disclosure, the first DRX configuration information is used for determining the first time range for the second terminal device. Here, the first time range is a time range determined based on a first DRX parameter in the first DRX configuration information. The first DRX parameter is used to determine a continuous sensing range for the second terminal device. That is, the first time range is the continuous sensing range for the second terminal device. For example, the first DRX parameter may be drx-onDurationTimer, and a time range corresponding to a period during which drx-onDurationTimer is running may be the first time range.

In an embodiment of the present disclosure, for a unicast communication scenario or a multicast communication scenario, the transmitting terminal needs to be informed of DRX configuration information of the receiving terminal (i.e., the first DRX configuration information) to ensure that data transmitted by the transmitting terminal can be received by the receiving terminal. The transmitting terminal (i.e., the first terminal device) may obtain the DRX configuration information of the receiving terminal (i.e., the second terminal device) in any one of the following schemes.

Scheme 1: the first terminal device receives the first DRX configuration information transmitted by the second terminal device. Here, the first DRX configuration information is DRX configuration information of the second terminal device.

In an optional implementation, the first DRX configuration information is carried in Sidelink Control Information (SCI), or PC5-Radio Resource Control (RRC) signaling, or a Media Access Control (MAC) Control Element (CE).

Optionally, the first DRX configuration information is carried in second-stage SCI, i.e., the first DRX configuration information is carried via an SCI format 0-2.

For example, the second terminal device transmits the SCI to the first terminal device. The SCI carries the first DRX configuration information.

For example, the second terminal device transmits the PC5-RRC signaling to the first terminal device. The PC5-RRC signaling carries the first DRX configuration information.

For example, the second terminal device transmits sidelink data to the first terminal device. The MAC CE of the sidelink data carries the first DRX configuration information.

Scheme 2: a group head terminal device configures DRX configuration information for individual terminal devices in a communication group. Further, optionally, the first DRX configuration information is DRX configuration information configured by a group head terminal device for the second terminal device. Alternatively, the first DRX configuration information is DRX configuration information configured by a group head terminal device for a group of terminal devices including the second terminal device.

In an optional implementation, the group head terminal device is the first terminal device; or the group head terminal device is the second terminal device; or the group head terminal device is a third terminal device. Here, the third terminal device is another terminal device different from the first terminal device and the second terminal device.

Based on this, when the group head terminal device is the first terminal device, the first terminal device is naturally able to know the first DRX configuration information it configures for the second terminal device.

Based on this, when the group head terminal device is the second terminal device or the third terminal device, the first terminal device obtains the first DRX configuration information from the second terminal device or the third terminal device.

In an optional implementation, the first DRX configuration information is carried in SCI, or PC5-RRC signaling, or an MAC CE.

For example, the second terminal device or the third terminal device transmits the SCI to the first terminal device. The SCI carries the first DRX configuration information.

For example, the second terminal device or the third terminal device transmits the PC5-RRC signaling to the first terminal device. The PC5-RRC signaling carries the first DRX configuration information.

For example, the second terminal device or the third terminal device transmits sidelink data to the first terminal device. The MAC CE of the sidelink data carries the first DRX configuration information.

Scheme 3: the first terminal device determines the first DRX configuration information based on pre-configuration information.

Here, for the terminal device in Mode 2 (or Mode B), the first DRX configuration information is obtained based on the pre-configuration information.

In an embodiment of the present disclosure, optionally, for any of the above schemes, the first terminal device obtains resource pool configuration information. The resource pool configuration information includes the first DRX configuration information.

In an optional implementation, the first DRX configuration information includes, but is not limited to, at least one of:

a first DRX parameter for determining a duration (or continuous sensing time) at the beginning of a DRX cycle, e.g., drx-onDurationTimer;

a second DRX parameter for determining a duration after a PSCCH occasion (in which a PSCCH is transmitted on the PSCCH occasion, and the PSCCH indicates sidelink data transmission), e.g., drx-InactivityTimer;

a third DRX parameter for determining a starting subframe of the DRX cycle and/or the DRX cycle, e.g., drx-LongCycleStartOffset, including drx-LongCycle and drx-StartOffset; and a fourth DRX parameter for determining a slot offset of start time of the first DRX parameter within a subframe (which is determined based on the third DRX parameter), e.g., drx-SlotOffset.

At block 602, the first terminal device selects a first resource having a time domain position located within the first time range.

(1) In an optional implementation of the present disclosure, the first terminal device determines a first candidate resource set. The first resource belongs to the first candidate resource set. That is, the first terminal device selects the first resource from the first candidate resource set, and the time domain position of the first resource is located within the first time range.

Here, the first terminal device determines the first candidate resource set within a resource selection window (which may also be referred to as a selection window) based on a sensing result. It should be noted that for the determination of the first candidate resource set, reference may be made to the above relevant description of the "sensing-based resource selection method", e.g., a process for determining "Set B".

Further, optionally, the first terminal device selects a second resource. The second resource belongs to the first candidate resource set. A time domain position of the second resource is located within the first time range. That is, the first terminal device selects the second resource from the first candidate resource set, and the time domain position of the second resource is located within the first time range.

In this embodiment, both the first resource and the second resource that are selected by the first terminal device are located within the first time range (i.e., the continuous sensing range of the second terminal device).

Figures 1, 7:
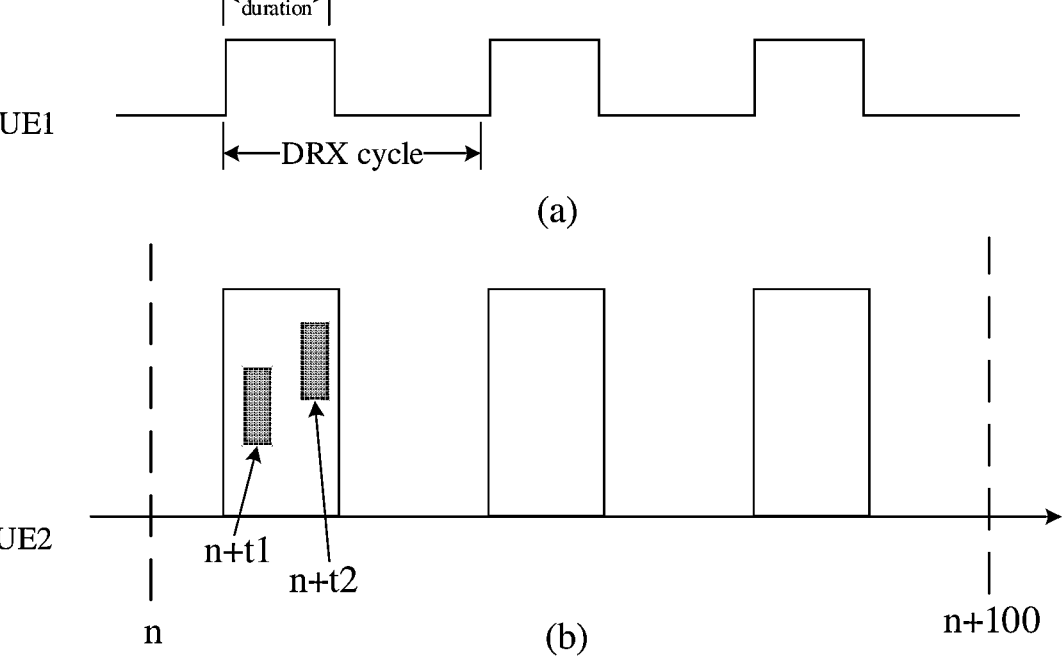
Figures 2, 7:
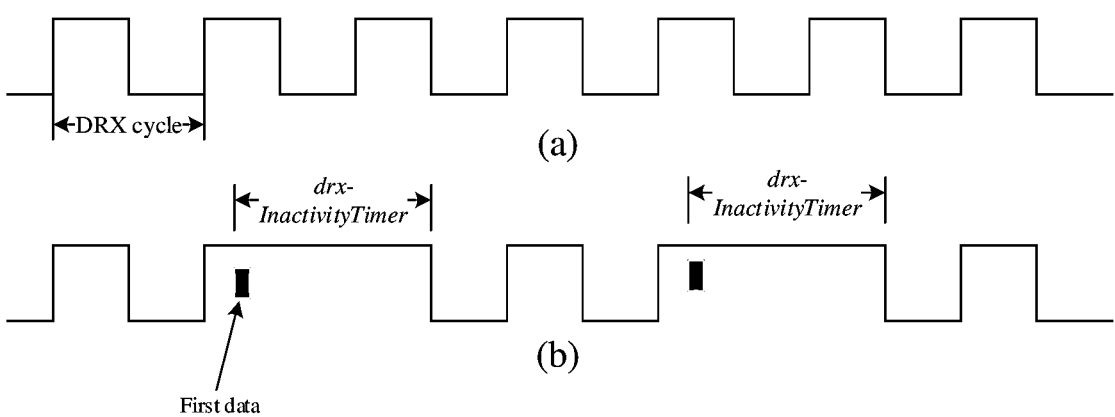
Figures 3, 7:
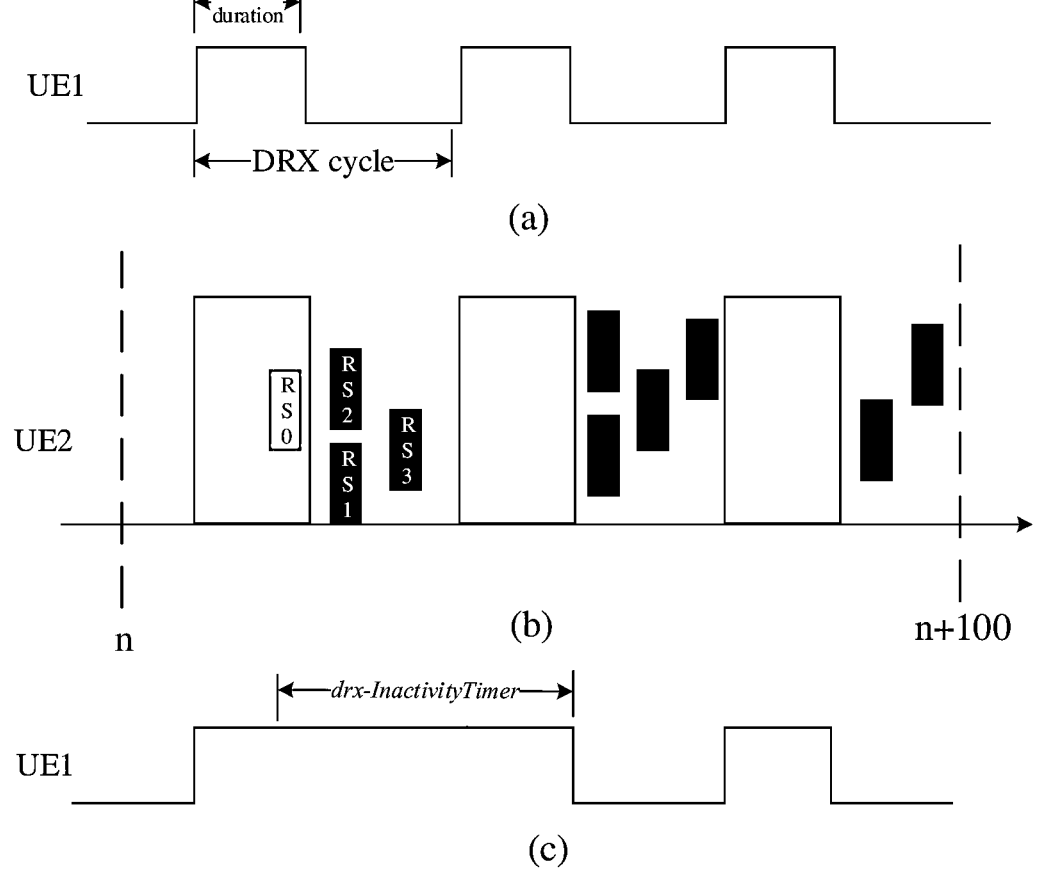

As illustrated in FIG. 7-1, FIG. (a) is a schematic diagram showing DRX of UE1 (a receiving terminal), and FIG. (b) is a schematic diagram showing resource selection of UE2 (a transmitting terminal). When UE2 performs resource selection at a time point n, the resource selection window is [n+1, n+100]. UE2 selects a resource within the resource selection window based on a sensing result. However, since data transmitted by UE2 needs to be received by UE1, UE2 needs to consider DRX configuration information of UE1 when selecting the transmission resource. That is, UE2 restricts its resource selection range based on the DRX configuration information of UE1. The resource selection window includes a DRX on duration of UE1 (i.e., continuous sensing range). Resources selectable by UE2 are within the DRX on duration of UE1, e.g., two resources corresponding to n+t1 and n+t2 in FIG. (b).

In an optional implementation, the first resource and the second resource are used to transmit a same data block. For example, the first resource is used for initial transmission of the sidelink data and the second resource is used for re-transmission of the sidelink data.

In this embodiment, the first terminal device performs the resource selection based on the DRX configuration information of the second terminal device. The selected first resource is located within a DRX on duration (i.e., continuous sensing range) of the second terminal device, thereby ensuring that the second terminal device may correctly receive the sidelink data transmitted by the first terminal device on the first resource.

2) In an optional implementation of the present disclosure, the first terminal device determines the first candidate resource set. The first resource belongs to the first candidate resource set. That is, the first terminal device selects the first resource from the first candidate resource set, and the time domain position of the first resource is located within the first time range.

Here, the first terminal device determines the first candidate resource set within a resource selection window (which may also be referred to as a selection window) based on a sensing result. It should be noted that for the determination of the first candidate resource set, reference may be made to the above relevant description of the "sensing-based resource selection method", e.g., a process for determining "Set B".

Further, optionally, the first terminal device selects the second resource that belongs to the first candidate resource set. A time interval between the first resource and the second resource is shorter than or equal to a time length corresponding to a first timer, or the time interval between the first resource and the second resource is determined based on the time length corresponding to the first timer. That is, the first terminal device selects the second resource from the first candidate resource set, and the time interval between the first resource and the second resource is shorter than or equal to the time length corresponding to the first timer.

In an embodiment, the first resource selected by the first terminal device is located within the first time range (i.e., the continuous sensing range of the second terminal device). The first terminal device transmits first data to the second terminal device on the first resource. The first data is used to trigger the second terminal device to start the first timer. Here, the first timer may be, e.g., a timer determined by the first DRX parameter (e.g., drx-onDurationTimer) or a timer determined by the second DRX parameter (e.g., drx-InactivityTimer).

Specifically, the first terminal device transmits the first data to the second terminal device on the first resource. The second terminal device, after receiving the first data, starts the first timer (i.e., drx-onDurationTimer or drx-InactivityTimer). Here, the first timer is used to determine a time range for continuous sensing by the second terminal device. Since the second terminal device starts the first timer after receiving the first data, the continuous sensing range for the second terminal device may be extended. The first terminal device selects the second resource within the continuous sensing range of the second terminal device, or in other words, the first terminal device selects the second resource while the first timer is running (i.e., the time interval between the first resource and the second resource is shorter than or equal to the time length corresponding to the first timer). In this way, both the first resource and the second resource can be within the continuous sensing range of the second terminal device.

Here, optionally, the first terminal device selects, in response to all resources of the first candidate resource set being located outside the first time range, the first resource within the first time range based on an RSRP measurement value (e.g., the first terminal device selects a resource having a smallest RSRP measurement value within the first time range as the first resource). Alternatively, the first terminal device selects the first resource within the first time range randomly.

FIG. 7-2 illustrates a working mechanism of DRX. Referring to FIG. 7-2, FIG. (a) is a DRX pattern obtained when the second terminal device receives no first data, and FIG. (b) is a DRX pattern obtained when the second terminal device receives the first data during the DRX on duration. When receiving the first data (e.g., PSCCH and/or PSSCH) during the on duration, the second terminal device starts the first timer (e.g., drx-onDurationTimer or drx-Inactivity-Timer), and is kept in an on duration state until the first timer expires. After the first timer expires, the terminal device may transition to an off duration state (or a DRX state).

In an optional implementation, the first resource and the second resource are used to transmit a same data block. For example, the first resource is used for initial transmission of the sidelink data and the second resource is used for re-transmission of the sidelink data.

The technical solutions according to this embodiment are exemplified below in combination with different examples.

Example 1

None of the resources in the first candidate resource set that is determined by the first terminal device based on the sensing result is within the on duration (i.e., continuous sensing range) of the second terminal device. The first terminal device selects the first resource during the on duration and transmits, on the first resource, the first data to the second terminal device. After receiving the first data, the second terminal device starts the first timer (e.g., drx-InactivityTimer), thereby extending the continuous sensing range of the second terminal device in such a manner that all or some of the resources in the first candidate resource set are located within the continuous sensing range of the second terminal device. The first terminal device selects the second resource from the first candidate resource set. Here, the time interval between the first resource and the second resource is shorter than or equal to the time length corresponding to the first timer (e.g., drx-InactivityTimer), thereby ensuring that the second resource is located within the continuous sensing range of the second terminal device.

Referring to FIG. 7-3, the first timer is exemplified by drx-InactivityTimer, and black blocks represent resources in the first candidate resource set that is determined by UE2 based on the sensing result. None of the resources in the first candidate resource set is within an on duration of UE1, i.e., a time range indicated by a white block. In this case, UE2 selects a first resource RS0 during the on duration and transmits the first data on the first resource RS0 to trigger UE1 to start drx-InactivityTimer, in which case a DRX pattern of UE1 changes from FIG. (a) to FIG. (c). That is, an on duration range of UE1 is extended. Therefore, UE1 may select a transmission resource, e.g., RS1, RS2, and RS3, in the first candidate resource set before expiry of drx-Inac-tivityTimer, and transmit sidelink data on the transmission resource, such that UE1 can receive the sidelink data.

Optionally, UE2 selects, based on the RSRP measurement value, the first resource RS0 having a smallest RSRP mea-surement value within the on duration. Alternatively, UE2 randomly selects the first resource RS0 within the on dura-tion.

Optionally, UE2 transmits the sidelink data to be trans-mitted on the first resource RS0, and performs retransmis-sion of the sidelink data on the second resource. Alterna-tively, UE2 transmits dummy data (e.g., random bits, redundant bits, etc.) on the first resource RS0, and performs transmission (including initial transmission and/or re-trans-mission) of the sidelink data to be transmitted on the second resource.

Example 2

The resources in the first candidate resource set that is determined by the first terminal device based on the sensing result are all or partially within the on duration (i.e., con-tinuous sensing range) of the second terminal device, but a number M of resources in the first candidate resource set that are within the on duration is smaller than a number N of resources to be selected by the first terminal device. The first terminal device selects the first resource from the M resources and transmits the first data to the second terminal device on the first resource. The second terminal device starts, after receiving the first data, drx-InactivityTimer to extend the continuous sensing range of the second terminal device. The first terminal device selects N−1 second resources from the first candidate resource set. A time interval between each of the N−1 second resources and the first resource is shorter than or equal to a time length corresponding to drx-InactivityTimer, thereby ensuring that the N−1 second resources are located within the continuous sensing range of the second terminal device.

Referring to FIG. 7-3, if RS0 also belongs to the first candidate resource set, but UE2 needs to select two trans-mission resources, when UE2 may be informed of a DRX parameter of UE1, a time range for continuous sensing corresponding to start of the timer by UE1 may be deter-mined based on the DRX parameter of UE1, e.g., drx-InactivityTimer. Therefore, UE2 may select RS0 as the first resource and select the second resource within a time range of drx-InactivityTimer having a time point of RS0 as a start time point. For example, RS1, RS2, or RS3 may be selected as the second resource, such that UE1 may trigger drx-InactivityTimer upon receiving RS0, extend the time range of the on duration, and receive the sidelink data carried by the second resource within the extended time range. In this embodiment, when there is no available candidate resource within the continuous sensing range for the second terminal device, or when the number of candidate resources is insufficient, the first terminal device uses the first resource to trigger the second terminal device to start drx-Inactivity-Timer, thereby ensuring that the second terminal device can receive data transmitted by the first terminal device on the second resource.

Figure 8:
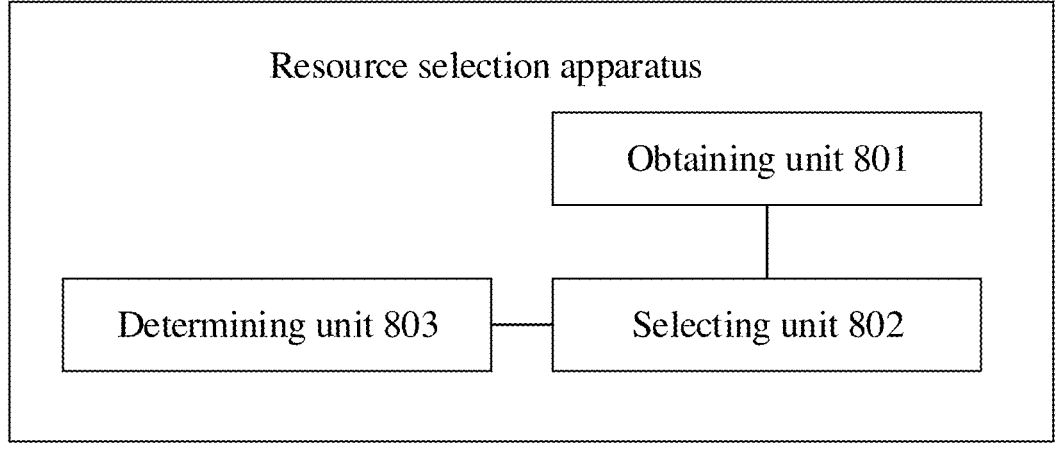
FIG. 8 is a schematic block diagram showing a structure of a resource selection apparatus according to an embodiment of the present disclosure.

FIG. 8 is a schematic block diagram showing a structure of a resource selection apparatus according to an embodi-ment of the present disclosure. As illustrated in FIG. 8, the resource selection apparatus includes an obtaining unit 801 and a selecting unit 802.

The obtaining unit 801 is configured to obtain first DRX configuration information used for determining a first time range for a second terminal device.

The selecting unit 802 is configured to select a first resource having a time domain position located within the first time range.

In an optional implementation, the first DRX configura-tion information is DRX configuration information of the second terminal device; and the obtaining unit 801 is con-figured to receive the first DRX configuration information transmitted by the second terminal device.

In an optional implementation, the first DRX configura-tion information is DRX configuration information config-ured by a group head terminal device for the second terminal device; or the first DRX configuration information is DRX configuration information configured by a group head ter-minal device for a group of terminal devices including the second terminal device.

In an optional implementation, the group head terminal device is a first terminal device; or the group head terminal device is the second terminal device; or the group head terminal device is a third terminal device.

In an optional implementation, when the group head terminal device is the second terminal device or the third terminal device, the obtaining unit 801 is configured to obtain the first DRX configuration information from the second terminal device or the third terminal device.

In an optional implementation, the first DRX configuration information is carried in SCI, or PC5-RRC signaling, or an MAC CE.

In an optional implementation, the first DRX configuration information is DRX configuration information of the second terminal device; and the obtaining unit 801 is configured to determine the first DRX configuration information based on pre-configuration information.

In an optional implementation, the obtaining unit 801 is configured to obtain resource pool configuration information. The resource pool configuration information includes the first DRX configuration information.

In an optional implementation, the apparatus further includes a determining unit 803. The determining unit 803 is configured to determine a first candidate resource set. The first resource belongs to the first candidate resource set.

In an optional implementation, the selecting unit 802 is further configured to select a second resource. The second resource belongs to the first candidate resource set. A time domain position of the second resource is located within the first time range, or a time interval between the first resource and the second resource is shorter than or equal to a time length corresponding to a first timer.

In an optional implementation, the first timer is configured to determine a time range for continuous sensing by the second terminal device.

In an optional implementation, the apparatus further includes a transmitting unit (not shown). The transmitting unit is configured to transmit, via the first resource, first data to the second terminal device. The first data is used to trigger the second terminal device to start the first timer.

In an optional implementation, the first resource and the second resource are used to transmit a same data block.

In an optional implementation, the selecting unit 802 is configured to select, in response to all resources of the first candidate resource set being located outside the first time range, the first resource within the first time range based on an RSRP measurement value; or select the first resource within the first time range randomly.

In an optional implementation, the determining unit 803 is configured to determine the first candidate resource set within a resource selection window based on a sensing result.

It should be understood by those skilled in the art that relevant description of the resource selection apparatus according to any of the embodiments of the present disclosure may be construed with reference to relevant description of the resource selection method according to any of the embodiments of the present disclosure.

Figure 9:
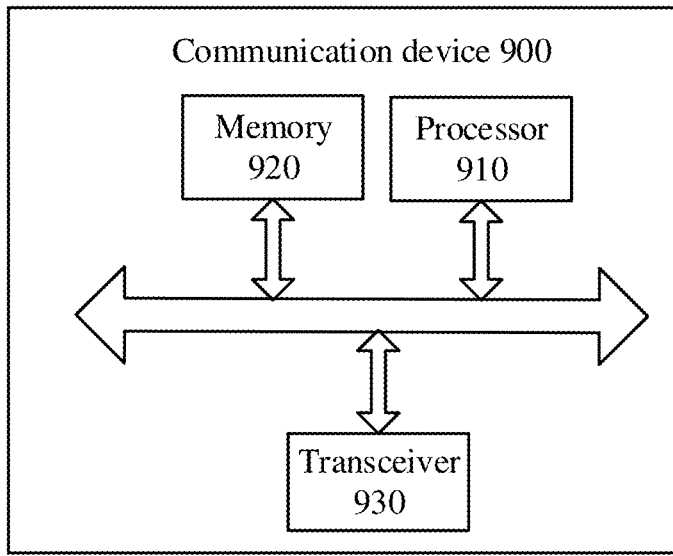
FIG. 9 is a schematic block diagram showing a structure of a communication device according to an embodiment of the present disclosure.

FIG. 9 is a schematic block diagram showing a structure of a communication device 900 according to an embodiment of the present disclosure. The communication device may be a terminal device. The communication device 900 illustrated in FIG. 9 includes a processor 910. The processor 910 is configured to invoke and execute a computer program from a memory to perform the method according to any of the embodiments of the present disclosure.

Optionally, as illustrated in FIG. 9, the communication device 900 may further include a memory 920. The processor 910 may invoke and execute a computer program from the memory 920 to perform the method according to any of the embodiments of the present disclosure.

Here, the memory 920 may be a separate component independent of the processor 910, or may be integrated in the processor 910.

Optionally, as illustrated in FIG. 9, the communication device 900 may further include a transceiver 930. The processor 910 may control the transceiver 930 to communicate with other devices, specifically, to transmit information or data to other devices, or receive information or data transmitted by other devices.

Here, the transceiver 930 may include a transmitter and a receiver. The transceiver 930 may further include one or more antennas.

Optionally, the communication device 900 may specifically be a network device according to an embodiment of the present disclosure. The communication device 900 may execute corresponding processes implemented by the network device in the method according to any of the embodiments of the present disclosure. For brevity, details thereof will be omitted herein.

Optionally, the communication device 900 may specifically be the mobile terminal/terminal device according to any of the embodiments of the present disclosure. The communication device 900 may implement corresponding processes implemented by the mobile terminal/terminal device in the method according to any of the embodiments of the present disclosure. For brevity, details thereof will be omitted herein.

Figure 10:
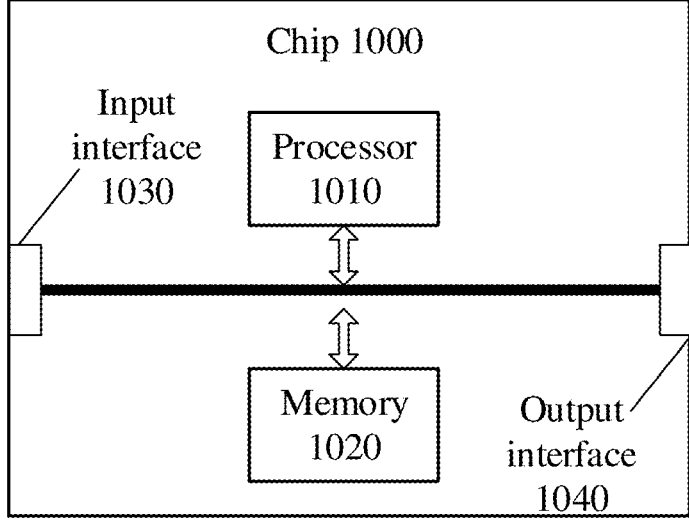
FIG. 10 is a schematic block diagram showing a structure of a chip according to an embodiment of the present disclosure.

FIG. 10 is a schematic block diagram showing a structure of a chip according to an embodiment of the present disclosure. A chip 1000 illustrated in FIG. 10 includes a processor 1010. The processor 1010 can invoke and execute a computer program from the memory to perform the method according to any of the embodiments of the present disclosure.

Optionally, as illustrated in FIG. 10, the chip 1000 may further include a memory 1020. The processor 1010 may invoke and execute a computer program from the memory 1020 to perform the method according to any of the embodiments of the present disclosure.

Here, the memory 1020 may be a separate component independent of the processor 1010, or may be integrated in the processor 1010.

Optionally, the chip 1000 may further include an input interface 1030. The processor 1010 can control the input interface 1030 to communicate with other devices or chips, and in particular, to obtain information or data transmitted by other devices or chips.

Optionally, the chip 1000 may further include an output interface 1040. The processor 1010 can control the output interface 1040 to communicate with other devices or chips, and in particular, to output information or data to other devices or chips.

Optionally, the chip can be applied to the network device according to any of the embodiments of the present disclosure. In addition, the chip can implement corresponding processes implemented by the network device in the method according to any of the embodiments of the present disclosure. For brevity, details thereof will be omitted herein.

Optionally, the chip can be applied to the mobile terminal/terminal device according to any of the embodiments of the present disclosure. The chip can implement corresponding processes implemented by the mobile terminal/terminal device in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

Figure 11:
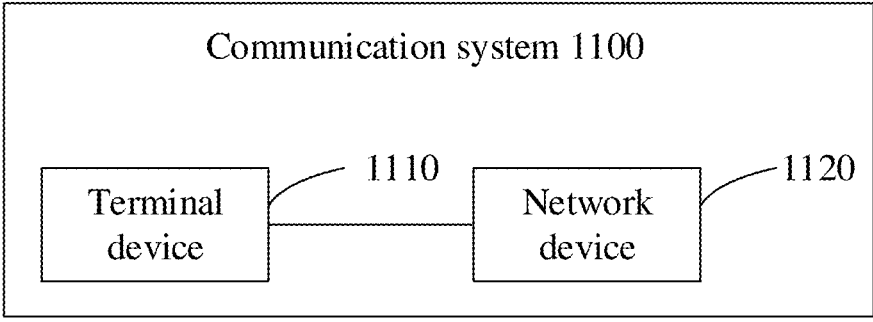
FIG. 11 is a schematic block diagram showing a communication system according to an embodiment of the present disclosure.

FIG. 11 is a schematic block diagram showing a communication system 1100 according to an embodiment of the present disclosure. As illustrated in FIG. 11, the communication system 1100 includes a terminal device 1110 and a network device 1120.

Here, the terminal device 1110 can be configured to implement the corresponding functions implemented by the terminal device in the above methods. The network device 1120 can be configured to implement corresponding functions implemented by the network device in the above methods. For brevity, details thereof will be omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A resource selection method, comprising:
   obtaining, by a first terminal device, first Discontinuous Reception (DRX) configuration information of a second terminal device used for determining a first time range for the second terminal device; wherein the first time range is a continuous sensing range for the second terminal device, the first terminal device is a sidelink transmitting terminal, and the second terminal device is a sidelink receiving terminal; and
   selecting, by the first terminal device, a first resource having a time domain position located within the first time range;
   wherein the method further comprises:
   determining, by the first terminal device, a first candidate resource set, wherein the first resource belongs to the first candidate resource set;
   selecting, by the first terminal device, a second resource, wherein the second resource belongs to the first candidate resource set, and a time domain position of the second resource is located within the first time range;
   wherein the first resource and the second resource are used to transmit a same sidelink data block.

2. The method according to claim 1, wherein the first DRX configuration information is DRX configuration information of the second terminal device; and the method further comprises:
   receiving, by the first terminal device, the first DRX configuration information transmitted by the second terminal device.

3. The method according to claim 2, wherein the first DRX configuration information is carried in PC5-Radio Resource Control (RRC) signaling.

4. The method according to claim 1, wherein
   the first DRX configuration information is DRX configuration information configured by the first terminal device for the second terminal device; or
   the first DRX configuration information is DRX configuration information configured by the first terminal device for a group of terminal devices comprising the second terminal device.

5. The method according to claim 1, wherein the first DRX configuration information is DRX configuration information of the second terminal device; and the method further comprises:
   determining, by the first terminal device, the first DRX configuration information based on pre-configuration information.

6. The method according to claim 1, further comprising:
   transmitting, by the first terminal device via the first resource, first data to the second terminal device, wherein the first data is used to trigger the second terminal device to start a first timer.

7. The method according to claim 1, wherein said determining, by the first terminal device, the first candidate resource set comprises:
   determining, by the first terminal device, the first candidate resource set within a resource selection window based on a sensing result.

8. The method according to claim 1, wherein the first DRX configuration information comprises at least one of:
   a first DRX parameter, drx-onDurationTimer;
   a second DRX parameter, drx-InactivityTimer;
   a third DRX parameter, drx-LongCycle and drx-StartOffset; and
   a fourth DRX parameter, drx-SlotOffset.

9. A non-transitory computer-readable storage medium, having a computer program stored thereon, wherein the computer program causes a computer to perform the method according to claim 1.

10. A terminal device, comprising:
   a memory having a computer program stored thereon; and
   a processor configured to invoke and execute the computer program stored in the memory to:

obtain first Discontinuous Reception (DRX) configuration information of a second terminal device used for determining a first time range for the second terminal device; wherein the first time range is a continuous sensing range for the second terminal device, a first terminal device is a sidelink transmitting terminal, and the second terminal device is a sidelink receiving terminal; and select a first resource having a time domain position located within the first time range;

and further to:

determine a first candidate resource set, wherein the first resource belongs to the first candidate resource set;

select a second resource, wherein the second resource belongs to the first candidate resource set, and a time domain position of the second resource is located within the first time range;

wherein the first resource and the second resource are used to transmit a same sidelink data block.

11. The terminal device according to claim 10, wherein the first DRX configuration information is DRX configuration information of the second terminal device; and the processor is further configured to invoke and execute the computer program stored in the memory to:

receive the first DRX configuration information transmitted by the second terminal device.

12. The terminal device according to claim 11, wherein the first DRX configuration information is carried in PC5-Radio Resource Control (RRC) signaling.

13. The terminal device according to claim 10, wherein the first DRX configuration information is DRX configuration information configured by the terminal device for the second terminal device; or the first DRX configuration information is DRX configuration information configured by the terminal device for a group of terminal devices comprising the second terminal device.

14. The terminal device according to claim 10, wherein the first DRX configuration information is DRX configuration information of the second terminal device; and the processor is further configured to invoke and execute the computer program stored in the memory to:

determine the first DRX configuration information based on pre-configuration information.

15. The terminal device according to claim 10, the processor is further configured to invoke and execute the computer program stored in the memory to:

transmit, via the first resource, first data to the second terminal device, wherein the first data is used to trigger the second terminal device to start a first timer.

16. The terminal device according to claim 10, wherein the processor is further configured to invoke and execute the computer program stored in the memory to:

determine the first candidate resource set within a resource selection window based on a sensing result.

17. The terminal device according to claim 10, wherein the first DRX configuration information comprises at least one of:

a first DRX parameter, drx-onDurationTimer;

a second DRX parameter, drx-InactivityTimer;

a third DRX parameter, drx-LongCycle and drx-StartOff-set; and a fourth DRX parameter, drx-SlotOffset.

* * * * *